Patented Dec. 11, 1945

2,390,860

UNITED STATES PATENT OFFICE 2,390,860

PURIFICATION OF PLANT RUBBERS

Ira Williams, Borger, Tex., assignor to J. M. Huber Corporation, Borger, Tex., a corporation of Delaware No Drawing. Application July 17, 1943,
Serial No. 495,188

11 Claims. (Cl. 260—817)

This invention pertains to the purification of natural plant rubbers such as those which are obtained by the disintegration of woody plants.

Rubber is contained in the woody parts or roots of many plants from which it is separated by grinding the plants and soaking the ground material in water to cause a separation of the rubber which floats and woody particles which will become water soaked and sink. Most of the rubber, available from such sources, is of good quality but contains large amounts of resins which must be removed in order to develop the best quality of rubber. An example of such rubber is that obtained from the guayule shrub which ordinarily contains from 20% to 30% of resinous material.

Heretofore it has been attempted to extract the resinous and other non-rubber materials from these crude plant rubbers by means of solvents for the resin, which are not solvents for the rubber. Such extraction has proved to be very troublesome. The rubber occurs in small particles which, due to their tacky and soft nature, tend to flow and cling together to form wet, spongy masses from which it is extremely difficult to extract the resin. These spongy masses are obtained by skimming them from the surface of the water. When it is attempted to extract such masses with resin solvents such as acetone and ethyl alcohol, the particles of the spongy masses are caused to flow and cling together more strongly, and hence to become more difficult to extract, particularly if heat is employed.

It is an object of the present invention to provide an improved method for extracting resinous and other non-rubber substances from plant rubbers. Another object is to provide such a method which will overcome the difficulties due to the tendency of the particles to coalesce. A further object is to provide a class of solvent mixtures which will effectively remove the non-rubber substances from crude plant rubbers. A still further object is to provide an improved method of more efficiently and completely removing resinous and like materials from plant rubbers. Still other objects will appear hereinafter.

The above and other objects may be accomplished in accordance with my invention, which comprises agitating resin-containing spongy masses of crude plant rubbers with a mixture of volatile resin solvents containing a non-solvent for the rubber and a rubber solvent, the proportion of the rubber solvent in the mixture being sufficient to cause the particles of the rubber in the masses to be readily separated by the agitation but insufficient to cause the separated particles to adhere to each other, and then, when the spongy masses have been disintegrated, separating the resulting rubber particles from the mixture of solvents. I have found that, if the spongy masses of the crude plant rubbers are agitated with a mixture of resin solvent, one of which is a rubber solvent but which is present in an amount such that the mixture is not a rubber solvent, the spongy masses will readily break apart into the original small particles of rubber and will remain separated while the extraction is continued. The particles will remain separated during further extraction treatments with additional amounts of solvent, and even if additional extractions are carried out solely with a solvent which is a non-solvent for the rubber.

It appears probable that the particles of the rubber in the spongy masses are held together with more or less point contact by thin filaments, which thin filaments are attacked and swollen by the rubber solvent in the solvent mixture so that such filaments are greatly weakened and hence are readily broken by the agitation.

Resin solvents, which are non-solvents for the rubber, are well known to those skilled in the art. Representative volatile solvents of this character, which are suitable for use in the practice of my invention, are methyl alcohol, ethyl alcohol, acetone, methyl-ethyl-ketone and ethyl-amine. Of the non-solvents for the rubber, I prefer to employ methyl alcohol, ethyl alcohol or acetone, as the best results are obtained therewith.

Rubber solvents are also generally well known to the art. Volatile rubber solvents, which are satisfactory for use in the practice of my invention, are represented by benzene, gasoline, carbon tetrachloride, ether, chloroform, xylene, cyclohexene and terpenes. Of these, I particularly prefer to employ gasoline or benzene, as they appear to be the most satisfactory for my purpose.

It is not possible to state the exact proportions of rubber solvent and non-solvent to be employed. The proportions required will vary somewhat with the composition of the rubber, and particularly with the amout of the resin and water in the crude rubber being treated. The proportions will also vary with the particular solvents employed in the combination. The proportions of the rubber solvent must be so controlled that it will swell and weaken the bonds between the rubber particles and yet will be insufficient to cause the rubber to swell and become soft and tacky enough to cause it to flow and stick together again after disintegration. The proportions of rubber solvent will also vary with the temperatures employed in the extraction. I have found that, with the preferred group of solvents, a mixture of approximately three parts of the non-rubber solvent to one part of the rubber solvent will give good results. The rubber solvent may be reduced somewhat, especially if a lesser degree of disintegration is desired. The amount of rubber solvent may also be increased considerably, especially if only a non-rubber solvent is employed for extraction after the spongy masses have been disintegrated. The proportions of solvent for any particular combination of solvents with any specific batch of crude plant rubber can be readily determined by a simple preliminary test which consists of placing some of the rubber in the non-rubber solvent in a flask which can be shaken, and then adding the rubber solvent until the rubber separates into small particles when shaken. The smallest amount of rubber solvent, required to cause a good separation of the rubber particles, is usually the most satisfactory. If more rubber solvent is added, a point will finally be reached where the particles of rubber will begin to stick together. This is slightly more rubber solvent than should be used. This preliminary test should be made at the temperature which is to be employed in the extraction process.

The amount of the mixture of solvents to be employed will depend upon practical considerations which will be apparent to those skilled in the art. Naturally, sufficient of the solvent mixture should be employed so that the rubber can be well dispersed into it during the agitation and so that the rubber will settle to leave some clear liquid above it. It is not necessary to use large volumes of the solvent mixture. The most practical amount seems to be that which, after about ten to about fifteen minutes of settling, leaves a clear layer over the rubber approximately equal to the dispersed rubber layer which settles. Generally, the rubber is heavier than the solvent and will readily settle therefrom. Where one of the solvents is a heavy liquid, such as carbon tetrachloride, the gravity of the mixture of solvents may be such as to cause the rubber to float; however, in such case, the rubber will frequently dissolve sufficient of the heavy solvent to increase the gravity of the rubber until it sinks.

Usually, the rubber will be subjected to a number of extractions in order to remove sufficient resin to produce rubber of a suitable character for further processing. All of the extractions may be carried out with a mixture of a rubber solvent and a non-rubber solvent. Generally, however, it will be preferred to carry out the first extraction with such a mixture of solvents so as to disintegrate the rubber, and then carry out the subsequent extractions with a solvent or mixture of solvents which do not contain a rubber solvent or which contain a smaller proportion of rubber solvent. Generally, three extractions, including the disintegration, will be sufficient and will remove about 90% of the resin from the rubber. However, any larger number of extractions may be employed as desired. The extration of a batch of rubber may be made continuous by disintegrating the rubber in a mixture of a rubber solvent and a non-rubber solvent, and then flowing further solvent through the disintegrated rubber.

The extractions may be satisfactorily conducted at ordinary atmospheric temperatures of about 15° C. to about 30° C., although slightly elevated temperatures, up to about 100° C., may be employed. The use of high temperatures should be avoided when they tend to cause the rubber particles to coalesce, and this will become apparent by the preliminary test hereinbefore described. The temperatures employed will also be dependent upon the solvent mixture, the temperature being maintained below the boiling point of the more volatile of the solvents. Generally, the best results are obtained at temperatures below 50° C. Because of the fine state of division of the rubber obtained in accordance with my invention, the extraction proceeds rapidly at ordinary atmospheric temperatures, and I prefer to employ such temperatures.

Non-solvents for rubber are usually good solvents for, or are miscible with water. The application of the mixture of solvents to the rubber, not only removes the resinous materials, but, at the same time, removes the water from the rubber. The rubber, after extraction, contains some of the rubber solvent which can be quickly removed by heating and can be recovered by any convenient process. The solvents, which contain the resins and water, can be distilled to recover the solvents for reuse. Guayule rubber, prepared in this manner, is firm, non-tacky and almost odorless.

It is usually desirable to incorporate a suitable antioxidant, such as p-hydroxy diphenyl or phenyl B naphthyl amine, into the rubber which is to be stored. This can be accomplished, either by incorporating the antioxidant with a rubber mill, or by rinsing the rubber in a solution of the antioxidant before it is dried.

In order to more clearly illustrate my invention, the preferred modes for carrying the same into effect and the advantageous results to be obtained thereby, the following examples are given in which the temperatures employed were atmospheric temperatures except where otherwise specifically indicated.

Example 1

500 grams of wet spongy masses of guayule rubber, which consisted of rubber particles well caked together, were torn into pieces about an inch in diameter. These were dropped slowly into 1250 cc. of an agitated solvent consisting of 3 parts of ethyl alcohol and 1 part of benzene. The rubber disintegrated almost at once. Stirring was continued for 10 minutes and the rubber was then permitted to settle. 850 cc. of liquor was removed and replaced with 850 cc. of fresh mixed solvent, and stirring continued. After 10 minutes, the mixture was permitted to settle and the upper liquor was removed and replaced with alcohol and stirred. Four additional extractions were carried out with alcohol. The rubber was finally filtered off, washed with a 10% solution of phenyl alpha naphthyl amine in alcohol and dried at 50° C. The resulting rubber had very little odor. 232 grams of purified rubber were obtained. 67 grams of resin was obtained from the solvent.

Example 2

The process of Example 1 was repeated with an initial solvent consisting of 3 parts of ethyl alcohol and one part of gasoline distilling below 100° C. Nine succeeding washes were made with alcohol. The results were substantially the same as in Example 1.

Example 3

100 grams of wet spongy masses of guayule rubber, in pieces about one-half inch across, were dropped into 250 cc. of a solvent consisting of 3 parts of acetone and one part of carbon tetrachloride in a flask. On shaking the flask, the rubber disintegrated at once and floated on the solvent. In a short time, sufficient carbon tetrachloride had been acquired by the rubber to cause it to sink. The solvent was then decanted and six additional extractions were made with a solvent consisting of 5 parts of acetone and one part of carbon tetrachloride. The rubber was then filtered off and milled dry while incorporating 1% of p-hydroxy diphenyl. 44 grams of rubber and 11 grams of resin were obtained.

*Example 4*

Guayule rubber, disintegrated in a mixture of 3 parts acetone and 1 part of benzene, was placed in an upright cylinder having a bottom opening and a side opening near the top. The material in the cylinder was stirred very slowly but not enough to prevent the maintenance of a layer of clear liquor in the top. Acetone was flowed slowly into the bottom opening and liquor, containing resin, overflowed from the side opening at the top of the cylinder. The acetone from the overflow was distilled, cooled by a condenser and returned to the bottom of the cylinder. After three hours, the rubber was well extracted.

Example 4 constitutes a continuous extraction of a batch of rubber. The process can be made continuous with respect to the rubber by introducing the disintegrated rubber near the top of the upright tube and removing it from the bottom, while fresh solvent is continually introduced at the bottom and resin solution is removed as in Example 4.

It will be understood that the above examples are given for illustrative purposes solely, and that many variations and modifications can be made therein without departing from the spirit and scope of my invention. For example, while I have shown a mixture of a single rubber solvent with a single non-rubber solvent, mixtures of rubber solvents may be employed with one or more non-rubber solvents and mixtures of non-rubber solvents may be employed with one or more rubber solvents. Accordingly, I intend to cover my invention broadly, as in the appended claims.

It will thus be seen that, by my invention, I have provided a simple and economical method for disintegrating the wet spongy masses of crude resin-containing plant rubbers, and purifying such plant rubbers to obtain a firm, non-tacky and almost odorless product which is in particularly good condition for further processing, such as compounding and vulcanizing. It involves the use of cheap, readily available solvents and low, readily-obtainable temperatures. The process is also easily operated, and produces the desired results in a minimum of time with a minimum of labor. Accordingly, the process results in substantial economies. It will thus be apparent that I have solved troublesome problems in the treatment of such plant rubbers.

I claim:

1. The method of disintegrating and purifying resin-containing spongy masses of crude guayule rubber which comprises agitating such masses with a mixture of volatile resin solvents containing approximately 3 parts of ethyl alcohol and approximately 1 part of benzene, and then, when the spongy masses have been disintegrated, separating the resulting rubber particles from the mixture of solvents.

2. The method of disintegrating and purifying resin-containing spongy masses of crude guayule rubber which comprises agitating such masses with a mixture of volatile resin solvents containing approximately 3 parts of ethyl alcohol and approximately 1 part of gasoline, and then, when the spongy masses have been disintegrated, separating the resulting rubber particles from the mixture of solvents.

3. The method of disintegrating and purifying resin-containing spongy masses of crude guayule rubber which comprises agitating such masses with a mixture of volatile resin solvents containing approximately 3 parts of acetone and approximately 1 part of benzene, and then, when the spongy masses have been disintegrated, separating the resulting rubber particles from the mixture of solvents.

4. The method of disintegrating and purifying resin-containing spongy masses of crude guayule rubber which comprises agitating such masses with a mixture of volatile resin solvents containing approximately 3 parts of ethyl alcohol and approximately 1 part of benzene, and then, when the spongy masses have been disintegrated, separating the resulting rubber particles from the mixture of solvents, and subjecting the disintegrated rubber to at least one further extraction with alcohol.

5. The method of disintegrating resin-containing spongy masses of crude guayule worms which comprises agitating such masses with a mixture of volatile resin solvents consisting of a non-solvent for the rubber and a rubber solvent, the proportion of the rubber solvent in the mixture being sufficient to cause the particles of the rubber in the masses to be readily separated by the agitation but insufficient to cause the separated particles to adhere to each other.

6. The method of disintegrating resin-containing spongy masses of crude guayule worms which comprises agitating such masses with a mixture of volatile resin solvents consisting of approximately 3 parts of a non-solvent for the rubber and approximately 1 part of a rubber solvent.

7. The method of disintegrating resin-containing spongy masses of crude guayule worms which comprises agitating such masses with a mixture of volatile resin solvents consisting of ethyl alcohol and a rubber solvent, the proportion of the rubber solvent in the mixture being sufficient to cause the particles of the rubber in the masses to be readily separated by the agitation but insufficient to cause the separated particles to adhere to each other.

8. The method of disintegrating resin-containing spongy masses of crude guayule worms which comprises agitating such masses with a mixture of volatile resin solvents consisting of acetone and a rubber solvent, the proportion of the rubber solvent in the mixture being sufficient to cause the particles of the rubber in the masses to be readily separated by the agitation but insufficient to cause the separated particles to adhere to each other.

9. The method of disintegrating resin-containing spongy masses of crude guayule worms which comprises agitating such masses with a mixture of volatile resin solvents consisting of approximately 3 parts of acetone and approximately 1 part of a rubber solvent.

10. The method of disintegrating resin-containing spongy masses of crude guayule worms which comprises agitating such masses with a mixture of volatile resin solvents consisting of a non-solvent for the rubber and a rubber solvent, the proportion of the rubber solvent in the mixture being sufficient to cause the particles of the rubber in the masses to be readily separated by the agitation but insufficient to cause the separated particles to adhere to each other, and then, when the spongy masses have been disintegrated, separating the resulting rubber particles from the mixture of solvents, and subjecting the disintegrated rubber to at least one extraction solely with a volatile non-solvent for the rubber.

11. The method of disintegrating resin-containing spongy masses of crude guayule worms which comprises agitating such masses with a mixture of volatile resin solvents consisting of approximately 3 parts of a non-solvent for the rubber and approximately 1 part of a rubber solvent, and then, when the spongy masses have been disintegrated, separating the resulting rubber particles from the mixture of solvents, and subjecting the disintegrated rubber to at least one extraction solely with a volatile non-solvent for the rubber.

IRA WILLIAMS.